US008204839B2

(12) United States Patent
Lee et al.

(10) Patent No.: US 8,204,839 B2
(45) Date of Patent: Jun. 19, 2012

(54) APPARATUS AND METHOD FOR EXPRESSING BEHAVIOR OF SOFTWARE ROBOT

(75) Inventors: Kang-Hee Lee, Seoul (KR);
Kwang-Choon Kim, Suwon-si (KR);
Jong-Hwan Kim, Daejeon (KR);
Ye-Hoon Kim, Daejeon (KR);
Se-Hyoung Cho, Daejeon (KR);
Seung-Hwan Choi, Daejeon (KR)

(73) Assignee: Samsung Electronics Co., Ltd (KR)

( * ) Notice: Subject to any disclaimer, the term of this patent is extended or adjusted under 35 U.S.C. 154(b) by 1091 days.

(21) Appl. No.: 12/027,631

(22) Filed: Feb. 7, 2008

(65) Prior Publication Data
US 2008/0195566 A1 Aug. 14, 2008

(30) Foreign Application Priority Data

Feb. 8, 2007 (KR) .......................... 10-2007-0013443
Feb. 4, 2008 (KR) .......................... 10-2008-0011422

(51) Int. Cl.
*G06F 15/18* (2006.01)
(52) U.S. Cl. ........................................................ 706/14
(58) Field of Classification Search .................... None
See application file for complete search history.

(56) References Cited

U.S. PATENT DOCUMENTS

| 2002/0082077 | A1 | 6/2002 | Johnson et al. |
| 2002/0156751 | A1 | 10/2002 | Takagi et al. |
| 2003/0074337 | A1* | 4/2003 | Sadakuni .......................... 706/11 |
| 2004/0243281 | A1 | 12/2004 | Fujita et al. |
| 2005/0143138 | A1* | 6/2005 | Lee et al. ...................... 455/566 |

FOREIGN PATENT DOCUMENTS

| KR | 1020020026165 | 4/2002 |
| KR | 1020040098498 | 11/2004 |
| KR | 1020050056824 | 6/2005 |
| KR | 100503652 | 7/2005 |

OTHER PUBLICATIONS

The Sims': Barba, 2000, Prima publishing, ISBN:7615-2339-1.*
'The Third Generation of Robotics: Ubiquitous Robots': Kim, 2004, International Conference on Autonomous Robots and Agents.*
'Genetic representation for evolvable artificial creature': Jong Hwan Kim, 2006, IEEE, 0-7803-9487, pp. 1947-1952.*

(Continued)

*Primary Examiner* — Kakali Chaki
*Assistant Examiner* — Peter Coughlan
(74) *Attorney, Agent, or Firm* — The Farrell Law Firm, P.C.

(57) ABSTRACT

Disclosed is a software robot apparatus and a method including detecting environmental information, detecting multiple external events objects, generating a sensor value having an effect on the software robot, changing physical states related to external events and internal events, generating a physical state value, changing a perception state, generating a perception state value corresponding to the changed perception state, changing an emotion state, generating an emotion state value; detecting an episode related to a behavior type, storing a variance related to each state, calculating a representative variance, and when a current perception state or a current emotion state is identified as unstable, detecting an episode capable of changing the unstable state into a normal state, determining a behavior and an object stored in the detected episode as a final behavior object, and expressing an actual behavior of the software robot to the object corresponding to the final behavior object.

39 Claims, 11 Drawing Sheets

OTHER PUBLICATIONS

'Implementation of artificial creature based on interactive learning': Yong Duk Kim, 2002 FIRA Robot Congress.*

Ushida et al., "Emotion Model for Life-Like Agent and Its Evaluation", Proceedings Fifteenth National Conference on Artificial Intelligence (AAAI-98), pp. 62-69.

Magnenat-Thalmann et al., "Virtual Humans: Thirty Years of Research, What Next?", Visual Computer, Dec. 2005 pp. 997-1015.

Kim et al., "Genetic Representation for Evolvable Artificial Creature", 2006 IEEE Congress on Evolutionary Computation, Jul. 16, 2006 pp. 1947-1952.

* cited by examiner

| BEHAVIOR | OBJECT | PARAMETER | | | FREQUENCY OF OCCURRENCE |
|---|---|---|---|---|---|
| | | CATEGORY | STATE | VARIATION | |
| 61 | 62 | 63 | 64 | 65 | 66 |

| EAT | OBJECT 1 | PERCEPTION | HUNGER | -10 | 1 |
| EAT | OBJECT 2 | PERCEPTION | HUNGER | -12 | 1 |
| EAT | OBJECT 2 | EMOTION | SADNESS | -5 | 1 |
| EAT | OBJECT 1 | EMOTION | HAPPINESS | 10 | 1 |
| BITE | OBJECT 3 | EMOTION | FEAR | 15 | 1 |
| BITE | OBJECT 4 | EMOTION | HAPPINESS | -8 | 1 |

FIG.9A

| EAT | OBJECT 1 | PERCEPTION | HUNGER | -20 |
|---|---|---|---|---|

FIG.9B

| EAT | OBJECT 1 | PERCEPTION | HUNGER | -11 | 2 |
| EAT | OBJECT 2 | PERCEPTION | HUNGER | -12 | 1 |
| EAT | OBJECT 2 | EMOTION | SADNESS | -5 | 1 |
| EAT | OBJECT 1 | EMOTION | HAPPINESS | 10 | 1 |
| BITE | OBJECT 3 | EMOTION | FEAR | 15 | 1 |
| BITE | OBJECT 4 | EMOTION | HAPPINESS | -8 | 1 |

FIG.9C

APPARATUS AND METHOD FOR EXPRESSING BEHAVIOR OF SOFTWARE ROBOT

PRIORITY

This application claims priority under 35 U.S.C. §119(a) to applications filed in the Korean Industrial Property Office on Feb. 8, 2007 and assigned Serial No. 2007-13443, and filed Feb. 4, 2008 and assigned Serial No. 2008-11422, the contents of both of which are incorporated herein by reference.

BACKGROUND OF THE INVENTION

1. Field of the Invention

The present invention relates to a genetic robot, and more particularly to a software robot apparatus and a method for expressing the behavior of a software robot by the software robot apparatus.

2. Description of the Related Art

In general, a genetic robot refers to an artificial creature, a software robot (i.e., a sobot), or a general robot, each of which has its own genetic codes. A genetic code of a robot signifies a single robot genome including multiple artificial chromosomes. The software robot refers to an artificial creature in the form of software, which can move through a network, can act as an independent software agent interacting with a user, and can act as an intelligent unit of a robot that connects a hardware robot with a sensor network. The term "robot" itself signifies a robot in the general sense, which has elements of typical senses, intelligence, and behavior in a physical environment. Accordingly, in the case where a software robot is substituted for an intelligent unit of a robot, in meaning which commonly holds true, it goes without saying that the present invention is equally valid in a common robot. An intelligent unit of a robot can be replaced either through optional replacement through a network or another storage medium in a ubiquitous environment beyond time and space or by embedding a replacement in a robot during the manufacturing of the robot.

The multiple artificial chromosomes defined in the above software robot interact with an environment outside of the robot and define individuality or personality peculiar to the robot, which determine change of internal states including motivation, homeostasis, emotion states, etc., in the robot and expressed behavior accompanied by the change of internal states. Table 1 below shows the definitions of an artificial creature, motivation, homeostasis, emotions, and behavior.

TABLE 1

| | |
|---|---|
| artificial creature | An artificial creature that acts on the motivation of a robot itself, has emotions, and can select its behavior, interacting with a human being in real time. |
| Individuality | It is not a simple summarization of behavior but is a determiner of a part or the whole thereof, and may be construed as personality in view of a human being. A concept including motivation, homeostasis, and emotions. Namely, an individuality engine corresponds to an engine having all of motivation, homeostasis, and emotions. A determiner that generates various kinds of internal states and behavior expressions. |
| Motivation | A process which motivates and keeps activities of a living body, and controls the pattern of the activities thereof. Causes of selecting and performing behavior. For example, curiosity, intimacy, boredom, evasive desire, possessiveness, and the like. |
| Homeostasis | A function which enables an organism to keep a stable physiological state as an individual even if it is incessantly affected by changes of external and internal environments. Causes of selecting and performing behavior. For instance, hunger, sleepiness, fatigue, and the like. |
| Emotions | Subjective restlessness induced when a living body takes a certain behavior. For example, happiness, sadness, anger fear, and the like. |
| Behavior | The general term for an individual's behaviors, including moving to a specific spot, stopping, and the like. For instance, in the case of animals, sleeping, feeding, running, and the like. The number of kinds of behaviors that an individual can select is limited, and in a certain instant, each individual can execute only one behavior. |

The artificial chromosome includes essential element-related genetic information, internal state-related genetic information, and behavior determination-related genetic information. The essential element-related genetic information refers to essential parameters which have a great effect on the change of internal states and external behavior expression. The internal state-related genetic information refers to parameters which affect internal states of a robot in relation to an external input applied to the robot. Furthermore, the behavior determination-related genetic information refers to parameters which determine external behavior related to the above internal states, depending on currently determined internal states.

The internal states refer to states, such as motivation, homeostasis, emotions, and the like. In other words, as noted from Table 2 below, the internal states of the robot can be determined by respective internal states and parameters of the internal states depending on respective external stimuli, i.e., by the genetic information related to the internal states.

TABLE 2

| | Internal states | | | | | | | |
|---|---|---|---|---|---|---|---|---|
| External stimuli | Motivation | | | Homeostasis | | | Emotions | |
| | Intimacy | ... | Hostility | Hunger | ... | Sleepiness | Happiness | ... Sadness |
| patting | 80 | ... | −40 | 0 | ... | 0 | 40 | ... −20 |
| beating | −30 | ... | 50 | 0 | ... | 0 | −30 | ... 30 |
| surprising | 0 | ... | 5 | 0 | ... | 0 | 10 | ... 0 |
| ... | ... | ... | ... | ... | ... | ... | ... | ... |
| soothing | 40 | ... | −40 | 0 | ... | 0 | 50 | ... −50 |

The same can be said for the behavior determination-related genetic information. However, the behavior determination-related genetic information includes various expressible behaviors, instead of the external stimuli. That is, the behavior determination-related genetic information includes parameters related to specific behaviors for respective internal states, i.e. parameters of internal states, such as motivation, homeostasis, and emotions, which have values capable of expressing respective behaviors.

Essential parameters that have a great effect on a change of each internal state and on external behavior expression may include a volatility, an initial value, an average mean value, a convergence value, an attenuation value according to time, a specific value determined by a specific time, and the like. Such essential parameters may separately include essential element-related genetic information. Hence, this essential element-related genetic information can include: a volatility according to each of the internal states, that is, internal states of motivation, homeostasis, and emotion, an initial value, an average mean value, a convergence value, an attenuation value, a specific value, and so on. As described above, a robot genome includes the essential element-related genetic information, the internal state-related genetic information, and the behavior determination-related genetic information. The essential element-related genetic information includes parameters of internal states and elements, which correspond to the internal states and are essential to a change of the internal states and expression of external behaviors. The internal state-related genetic information includes parameters of various external stimuli and internal states corresponding to the external stimuli. The behavior determination-related genetic information includes parameters of various expressed behaviors and internal states corresponding to the expressed behaviors. Namely, as noted from Table 3 below, the robot genome can express, through a two-dimensional matrix, genetic information according to respective internal states and according to essential elements, external stimuli, and expressed behaviors corresponding to the internal states, respectively.

a user with services without restrictions on time and space in a ubiquitous environment. Therefore, in order to freely move over a network, the software robot has an IP address of a transitable device.

As described above, a conventional software robot forms an emotion and then selects the final behavior based on the internal states, that is, based on motivation for a determination of behavior, homeostasis for maintenance of life, and emotion expressed by facial expression. Accordingly, a conventional software robot apparatus includes: a recognition unit for sensing an external environment; an internal state unit for expressing internal states, such as an emotion of a virtual creature; a behavior determination unit for determining the behavior of the virtual creature by using external information and the internal states; a learning unit for adapting the virtual creature to external states; and a behavior implementation unit for realizing the behavior of the virtual creature.

SUMMARY OF THE INVENTION

The conventional software robot apparatus configured as above usually expresses its emotions by means of an emotion model corresponding to a numerical value of an emotion state, and reflects only an emotion model adapting itself to an environment in determining behavior responding to a user's input. It can be said that the above structure reflects only a mental state of the software robot without reflecting a physical state thereof. However, in order to enable the software robot to show a more life-like behavior, the physical state must be also considered.

In addition, the conventional software robot apparatus has a simple input/output structure, and does not reflect the influence on the software robot apparatus itself by a behavior determined and executed by the software robot apparatus. As a human being does not repeat a previous mistake in selecting a behavior next time based on an unhappy result by the mistake due to improper behavior of the human being for a given situation, the software robot needs to reflect (feedback) a result of its behavior in updating internal state values.

TABLE 3

|  |  | Motivation | | Homeostasis | | Emotion | |
| --- | --- | --- | --- | --- | --- | --- | --- |
|  |  | Intimacy | ... Hostility | Hunger | ... Sleepiness | Happiness | ... Sadness |
| Essential elements | Volatility Initial value ... Attenuation Value | Essential element-related gene (motivation) | | Essential element-related gene (homeostasis) | | Essential element-related gene (emotion) | |
| External stimuli | Patting Beating ... Soothing | Internal state-related gene (motivation) | | Internal state-related gene (homeostasis) | | Internal state-related gene (emotion) | |
| Expressed behavior | Laughing Looking around ... Rolling | Behavior determination-related gene (motivation) | | Behavior determination-related gene (homeostasis) | | Behavior determination-related gene (emotion) | |

Therefore, a current robot platform determines a specific expressed behavior based on current internal states, such as motivation, homeostasis, emotions, and implements behavior based on the determination. For example, if an internal state of a robot corresponds to a hungry state, the robot determines to execute a behavior for something or other and puts the determination into action. As a result, the robot can be implemented so as to act like an actual creature. The software robot having the characteristics as described above should provide Also, the structure of the conventional software robot apparatus corresponds to a simple structure for interaction between a single software robot and surrounding items (e.g., a ball, a master, a doll, etc.), other than a complicated structure reflecting interaction between various virtual creatures. However, when there are multiple software robots having various characteristics, one software robot needs to recognize other software robots as other independent objects.

Furthermore, behaviors of the conventional software robot are simplified in order to express various behaviors, and accordingly, the relation between a previous behavior and the next behavior is unnatural in the conventional software robot. On this account, whenever internal states change, the conventional software robot frequently shows sequential behaviors which have no interrelation at all. This is because the conventional software robot apparatus has a structure of sequentially processing data transfer between internal configuration modules. That is, the conventional software robot apparatus has a structure in which output data is delivered to a next configuration module only after one configuration module receives and processes an input. Therefore, in order to test an intermediate configuration module, it is inevitable to execute a previous configuration module and obtain output data from the previous configuration module, which weakens the independence between configuration modules.

Accordingly, the present invention has been made to solve the above-stated problems occurring in the prior art, and the present invention provides a software robot apparatus, which can naturally act, express its emotions, and interact with a user, like an actual creature.

Also, the present invention provides a software robot apparatus, which behaves based on a physical state thereof, so that it can give a more life-like feeling to a user thereof.

Further, the present invention provides a software robot apparatus having a more intelligent structure, in which a result of a behavior expressed by a software robot is fed back and reflected in internal states of the software robot, so that the software robot can evolve while continuously interacting with a user.

Still further, the present invention provides a software robot apparatus which can recognize each of various existing virtual creatures as an independent object in consideration of interaction between the multiple virtual creatures.

Yet further, the present invention provides a software robot apparatus which has an integrated data structure for storing input/output of all data between configuration modules.

In order to accomplish these objects of the present invention, there is provided a software robot apparatus providing a cyberspace in which multiple objects including at least one software robot exist and multiple environmental factors exist, the software robot apparatus including a sensor unit for detecting environmental information including a change of the multiple environmental factors and positions of the multiple objects, and detecting multiple external events occurring according to an interaction among the multiple objects, and then generating a sensor value having an effect on the software robot; a state unit for changing each physical state related to each of the multiple external events and each of multiple internal events occurring in relation to the software robot from among multiple predefined physical states, generating a physical state value corresponding to the changed physical state, changing a perception state related to the physical state value and the sensor value from among multiple predefined perception states, generating a perception state value corresponding to the changed perception state, changing an emotion state related to the perception state value from among multiple predefined emotion states, and generating an emotion state value corresponding to the changed emotion state; an episode memory unit for detecting an episode related to a behavior type of a behavior expressed by the software robot from among multiple episodes storing a variance related to each state, which correspond to a combination of at least one object in the cyberspace, predefined behavior types, predefined emotion states, and predefined perception states, calculating a representative variance by using the variance stored in the found episode and a generated variance corresponding to the expressed behavior, and storing the representative variance as a variance of the detected episode; and a behavior unit for, when a current perception state or a current emotion state is identified as a predetermined unstable perception state or emotion state based on the perception state value and the emotion state value, enabling the episode memory unit to detect an episode capable of changing the predetermined unstable perception state or emotion state into a normal state, determining a behavior and an object stored in the detected episode as a final behavior object, expressing an actual behavior of the software robot to the object corresponding to the final behavior object, and generating an internal event due to expression of the actual behavior.

BRIEF DESCRIPTION OF THE DRAWINGS

The above and other exemplary features, aspects, and advantages of the present invention will be more apparent from the following detailed description taken in conjunction with the accompanying drawings, in which:

FIGS. 9A to 9C illustrate a process for storing episodes according to an embodiment of the present invention;

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear.

Figure 16:
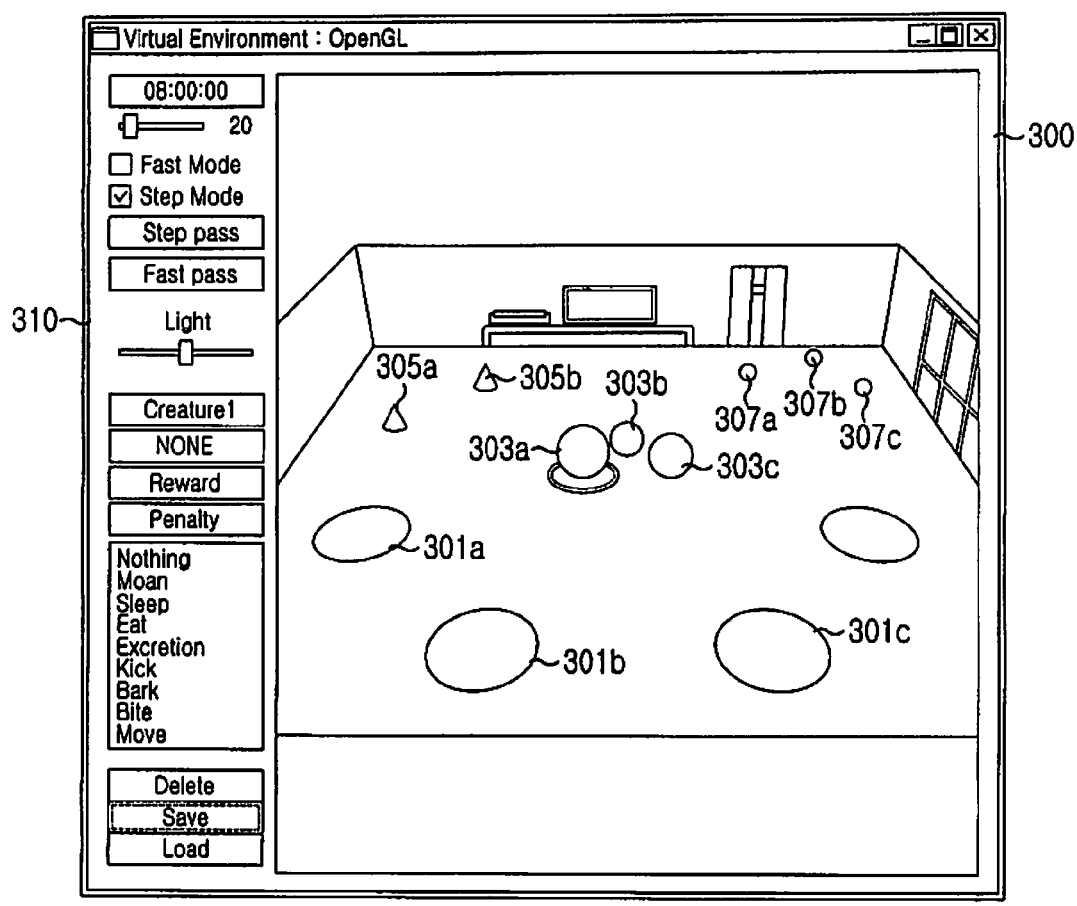
FIG. 16 illustrates a screen including a cyberspace and a user menu according to an embodiment of the present invention.

A software robot inevitably exists in cyberspace in view of its characteristics. According to the present invention, one or more software robots can exist in cyberspace for the software robot. Besides the software robots, various components capable of expressing the cyberspace, such as items, food, toys, and chairs, may exist in the cyberspace of the software robot. One example of such a cyberspace as described above is illustrated in FIG. 16. FIG. 16 shows a screen including a cyberspace 300 and a user menu 310 according to an embodiment of the present invention. Referring to FIG. 16, a plurality of spots 301a, 301b and 301c, a plurality of toys 305a and 305b, a plurality of food items 307a, 307b and 307c, and a plurality of software robots 303a, 303b and 303c are placed within the cyber space. As used herein, in the present invention, the software robots and all of the components existing in the cyberspace are generically referred to as objects. According to the present invention, a software robot apparatus can construct and provide the cyberspace to a user, and can control multiple objects existing in the cyberspace according to an internal logic or in response to a user's input. In the cyberspace, environmental information, which includes environmental factor information and object location information, and object interaction information can be generated depending on a change in the environmental factors, a movement of objects, or an interaction among the objects. The environmental factors refer to factors representing environmental properties of the cyberspace, and include temperature, humidity, time, the amount of sunshine, sound, spatial properties, and so forth. The object location information refers to information indicating a location of each stationary object or a current location of each moving object in the cyberspace. The object interaction information refers to information on direct interaction among objects, and is usually generated when one software robot interacts with another object. For example, when a software robot eats food or when a software robot named "a" beats another software robot named "b", the object interaction information may be generated.

According to the present invention, the software robot apparatus can either apply the environmental information to all software robots within the cyberspace without change in the environmental information, or apply the environmental information as an event to only related software robots. In general, the software robot apparatus delivers the environmental factors and the object location information to all software robots within the cyberspace through a specific function without a change in the environmental factors and the object location information. The delivered environmental factors and object location information are sensed by a sensor unit of each software robot apparatus, and can then be applied to each software robot. In addition, the object interaction information can be delivered to each software robot as an event. The event can be expressed by a specific function.

The event is necessary in order to apply a case occurring in the cyberspace to a related software robot. The event includes identification information of an object related to the behavior type, which includes subjective object identification information relating to the subject who carries out the event (i.e. who), target object identification information relating to the target influenced by the event (i.e. whom), behavior type information relating to the event (i.e. what), and effect information relating to the effect by the behavior (i.e. parameter). Herein, the effect information includes effects useful for a subjective object. In addition, the event can be classified into an external event and an internal event based on if the event relates to interaction between different objects or the event occurs within a single object. The external event refers to an event representing the interaction among different objects and corresponds to a case where the subjective object identification information is not equal to the target object identification information. For example, in the case of an event "a software robot eats food," the subjective object corresponds to "software robot," the target object corresponds to "food," the behavior type corresponds to "eats," and the effect by the behavior may be "a feeling of fullness or happiness". If all of the objects related to a particular behavior type are software robots, an external event corresponding to each of the software robots will be generated.

The internal event is an event when the software robot apparatus handles an internal influence by a result of a certain behavior of the software robot without interacting with another object. The internal event corresponds to a case where the subjective object identification information is equal to the target object identification information. As an example of the internal event, a case "a software robot walks" can be cited. In this example, both the subjective object and the target objective correspond to "software robot," the behavior type corresponds to "walks," and the effect of the behavior may be "fatigue". The software robot apparatus can detect the occurrence of such an event through a sensor unit or a physical state unit and applies the detected event to a relevant software robot.

According to an embodiment of the present invention, the environmental information can be expressed by using parameters and functions as defined in Tables 4, 5 and 6, and can be applied to a related software robot. Table 4 represents a member function of an object class related to objects existing in a cyberspace, Table 5 represents environmental factor class member parameters relating to environmental factors that may be generated in a cyberspace, and Table 6 represents important functions of an environmental factor class.

TABLE 4

| Parameter Name | Description | Remarks |
| --- | --- | --- |
| m_type | Value for identifying the object type | Food, toy, software robot |
| m_id | Unique number for identifying the object | |
| m_name | Name of the object | |
| m_size | Size of the object | |
| m_pos | Location of the object | |
| m_dir | Direction of the object | |
| m_calorie | Energy retained by food | Food type |
| m_taste | Taste of food | Food type |
| m_sound | Sound, character, and scale of the object | Toy type |

TABLE 5

| Parameter Name | Description |
| --- | --- |
| m_EventSet | A set of events occurring among objects existing in a cyberspace |
| m_EnvironmentOutputData | Information on environmental factors applied to a software robot |
| m_objectN | Number of objects existing in cyberspace |
| m_object[ ] | Arrangement of objects |
| m_creatureN | Number of software robots existing in a virtual environment |
| m_creature[ ] | Arrangement of software robots |

TABLE 6

| Important function | Description |
| --- | --- |
| InitEnvironment | to initiate an object existing in a cyberspace |
| ShowEnvironment | to implement an adequate user input/output |
| UpdateEnvironmentInformation | to update relevant software robot-related information by using changed information when information of the software robot on a screen is changed by a user |
| UpdateSensor | to deliver environmental factor data to each software robot |
| UpdateEvent | to deliver an external event to each software robot |
| EventReset | to initiate an external event |
| CreatureActivation | to execute a software robot |
| AddEventFromCreature | to newly generate an event |

Figure 1:
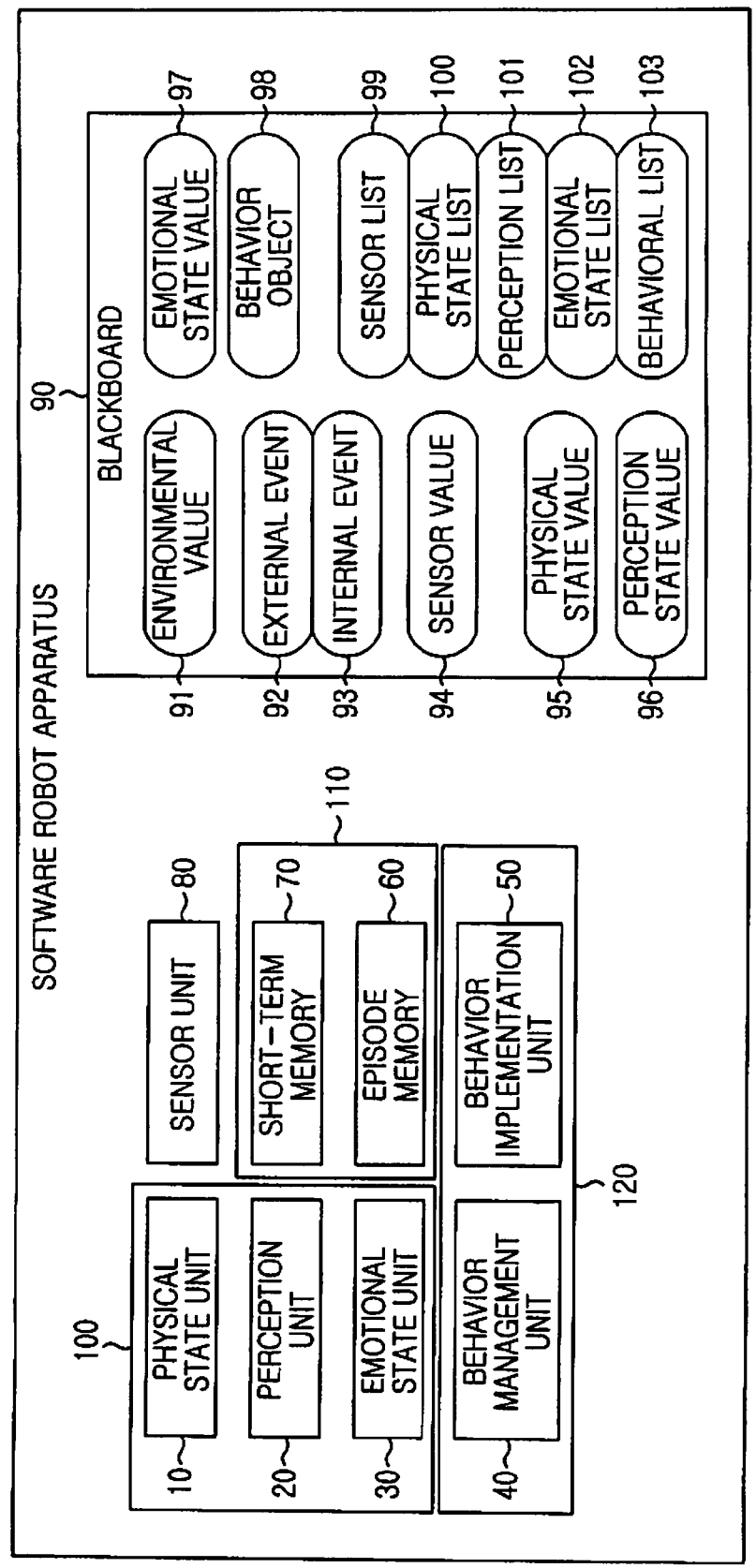
FIG. 1 illustrates the configuration of a software robot apparatus according to an embodiment of the present invention.

The software robot apparatus having the above features according to the present invention can be configured as illustrated in FIG. 1. As described above, a plurality of software robots may exist in a cyberspace provided by a single software robot apparatus, and management and control regarding each software robot can be implemented in the same manner. Nevertheless, in order to simplify an understanding of the present invention, the following description is based on a case in which a single software robot exists in the cyberspace. A role and an operation process of each configuration module in a software robot apparatus for actuating, managing, and controlling the single software robot will be described.

FIG. 1 illustrates the configuration of a software robot apparatus according to an embodiment of the present invention. With reference to FIG. 1, the software robot apparatus includes a sensor unit 80, a blackboard 90, a state unit 100, a memory unit 110, and a behavior unit 120. The state unit 100 includes a physical state unit 10, a perception unit 20, and an emotion state unit 30. The behavior unit 120 includes a behavior management unit 40 and a behavior implementation unit 50. The memory unit 110 includes a short-term memory 70, an episode memory 60, a working memory (not shown), and a common storage memory (not shown).

Each of the physical state unit 10, the perception unit 20, the emotion state unit 30, the behavior management unit 40, the sensor unit 80, and the behavior execution unit 50, which are included in the software robot apparatus, can be implemented as an independent module, and those modules can have relations to each other while exchanging data with each another. On this account, without standardizing the complex relations, it is required to define all methods and types of data to be exchanged for each relation in the implementation stage. The blackboard 90 is arranged in order to overcome such inconvenience, has a structure shared by various modules, and is used as a means for integrating various information resources. This structure corresponds to a concept of sharing information necessary for a number of people in order to solve a complex problem by recording the information on a blackboard. This structure has a common data area corresponding to a blackboard, which is located at a center of the structure and unifies information provided to the common data area from a plurality of modules. The blackboard 90 is implemented by a CBlackboard class. The CBlackboard class has various data structures as defined in Table 7 below, and the respective data information is provided to the respective modules constructing a virtual creature or is updated from the respective modules through relevant Put functions and Get functions.

TABLE 7

| Structure | Definition |
| --- | --- |
| Environmental value 91 | Virtual environmental information delivered to the software robot |
| External event 92 | Information on a case occurring in the cyberspace |
| Internal event 93 | Information on a case occurring inside the software robot |
| Sensor value 94 | Cyberspace information sensed by the software robot |
| Physical state value 95 | Physical state value of the software robot |
| Perception state value 96 | Perception information of the software robot |
| Emotion state value 97 | Ruling emotion value of the software robot |
| Behavior object value 98 | Behavior selected to be expressed & object related to the selected behavior |
| Sensor list 99 | Sense list existing in relation to the software robot |
| Physical state list 100 | All physical state lists related to the software robot |
| Perception list 101 | All perception lists related to the software robot |
| Emotion state list 102 | All emotion state lists related to the software robot |
| Behavior list 103 | All behavior lists related to the software robot |

A physical state value 95, a perception state value 96, and an emotion state value 97 recorded in the blackboard 90 include not only a representative physical state value, a representative perception state value, and a representative emotion state value, which the software robot currently possesses, but also physical state values corresponding to all physical states, perception state values corresponding to all perception states, and emotion state values corresponding to all emotion states.

Figure 2:
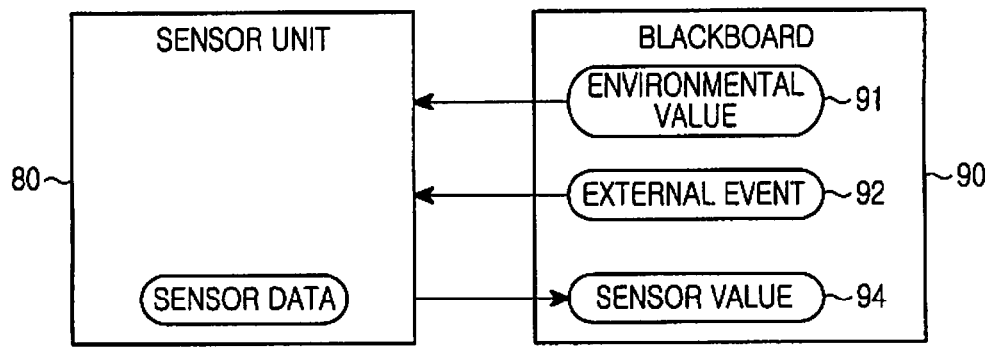
FIG. 2 illustrates a relation between a sensor unit and a blackboard according to an embodiment of the present invention.

The sensor unit 80 updates sensor data within the sensor unit 80 by using environmental information (i.e., an environmental value 91 of the blackboard 90) and an external event (i.e., an external event 92 of the blackboard 90) as input information, and outputs sensor data affecting the software robot to the blackboard 90 as a sensor value 94. The relation between the sensor unit 80 and the blackboard 90 is illustrated in FIG. 2. All information in the cyberspace is applied to the software robot in the form of environmental information and external events. However, information insensible depending on a current location or the capability of the software robot may exist in the cyberspace. Accordingly, the sensor unit 10 acts as a filter that allows only information currently able to be sensed by the software robot among multiple pieces of sensed information to be applied to the software robot. For example, information on the objects located beyond the range of vision of the software robot is not included in the sensor values 94, and events having no relations to the relevant software robot among external events are not processed either.

Figure 3:
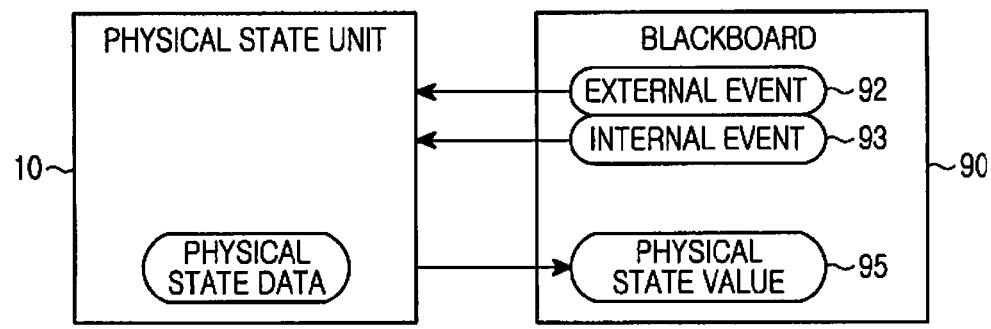
FIG. 3 illustrates a relation between a physical state unit and a blackboard according to an embodiment of the present invention.

The physical state unit 10 updates physical state data by changing a physical state of the software robot with reference to an external event 92 and an internal event 93 of the blackboard 90, and outputs the final value to the blackboard 90 as a physical state value 95. The relation between the physical state unit 10 and the blackboard 90 as described above is illustrated in FIG. 3. Physical states related to each external event 92, each internal event 93 and each environmental information, and the degree of change in the state values of the related physical states are determined by artificial genetic information of the software robot, etc. Examples of the above physical states, as described in Table 8 below, may include an ingestion quantity, energy, excretion desire, activity power, health state, and growth degree.

TABLE 8

| State | Definition | Influence |
|---|---|---|
| Ingestion quantity (stomach) | Amount of food ingested before being digested | Hunger |
| Energy | Magnitude of possessed energy | Digestion activity |
| Excretion desire | Amount of wastes to be excreted | Excretion |
| Activity | Activity power | Fatigue |
| Health state | State of health | Activity power |
| Growth degree | Degree of physical growth | External shape of the virtual creature. |

Figure 4:
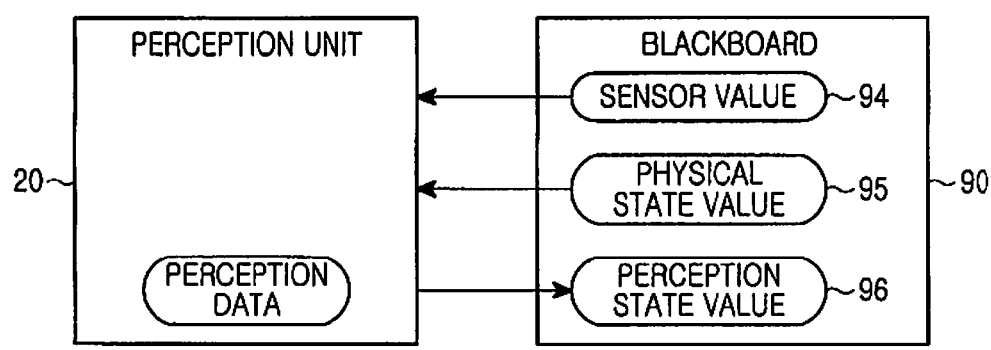
FIG. 4 illustrates a relation between a perception unit and a blackboard according to an embodiment of the present invention.

The perception unit 20 corresponds to a module for managing a result of perception of the environmental information of the cyberspace and the physical state by the software robot. The perception unit 20 perceives an external environment through a sensor value of the blackboard 90, perceives an internal state of the software robot through the physical state value 95, updates perception data, and then outputs a perception state value 96 to the blackboard 90. At this time, a perception state related to each sensor value and a perception state related to each physical state are predetermined. The relation between the perception unit 20 and the blackboard 90 as described above is illustrated in FIG. 4. For example, when the sensor unit 80 gives information "beaten with a power having a magnitude of 100," a perception "being painful" can be obtained. Also, when the magnitude of retained energy becomes less than 10, the perception "being hungry" can be attained. In the present invention, the perception state value 96 is expressed by two values. $P_{TRUE}$ and $P_{FALSE}$ denotes affirmative perception and negative perception regarding relevant perception states, respectively. In general, $P_{TRUE}$ and $P_{FALSE}$ have a property as defined in Equation (1) below.

$$P_{TRUE} + P_{FALSE} = 1 \quad (1)$$

For example, in a case where the perception state is "hunger", hunger may be an affirmative perception while the full stomach may be a negative perception. In this case, $P_{TRUE}$ represents hunger, and $P_{FALSE}$ represents the full stomach. According to an embodiment of the present invention, types of perception states can be defined as in Table 9 below.

TABLE 9

| State | Definition |
|---|---|
| Brightness | Brightness of a virtual environment |
| Sound | Loudness of sound generated in a virtual environment |
| Taste | Taste of eaten food |
| Hunger | Degree of hunger |

TABLE 9-continued

| State | Definition |
|---|---|
| Fatigue | Degree of fatigue |
| Beating (Hitting) | Degree of beating applied to a virtual creature by a case happening in a virtual environment |
| Patting | Degree of patting applied to a virtual creature by a case happening in a virtual environment |

Figure 5:
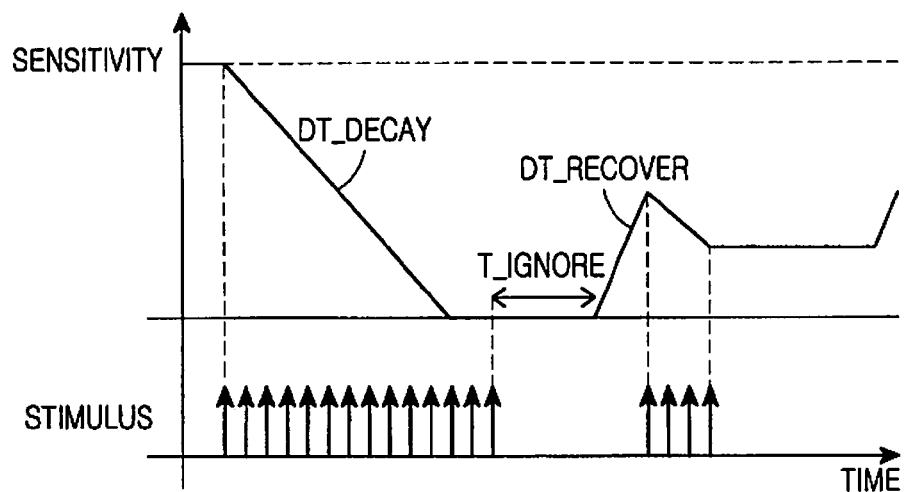
FIG. 5 is a graph illustrating a relation between a stimulus and sensitivity according to an embodiment of the present invention.
Figure 6:
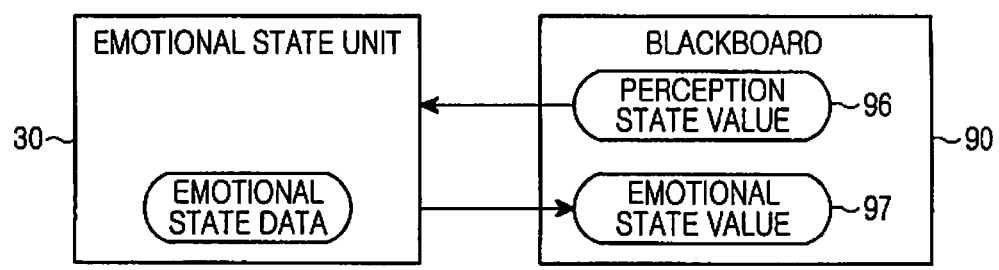
FIG. 6 illustrates a relation between an emotion state unit and a blackboard according to an embodiment of the present invention.

A function of changing sensitivity when the same stimulus is continuously applied is implemented in the perception unit 20. Sensitivity representing the extent to which a stimulus is felt is set one by one for each stimulus, and affects the degree by which each perception state changes. The magnitude of the sensitivity can be differently set for each stimulus, and can be set in such a manner that the magnitude of the sensitivity may adaptively change depending on the number of times by which the same sensitivity continuously occurs. When a stimulus is continuously sensed, the sensitivity of the stimulus gets smaller and finally becomes zero. If a stimulus is not sensed during a certain period of time, the original sensitivity is gradually recovered. FIG. 5 illustrates the relation between the stimulus and the sensitivity. With reference to FIG. 5, when the same stimulus continues to be sensed, sensitivity decreases by the slope of DT_DECAY. Also, even after a stimulus stops, the sensitivity is not restored during a time period of T_IGNORE. If there is no stimulus during a time period longer than T_IGNORE, the sensitivity is restored by the slope of DT_RECOVER.

The emotion state unit 30 corresponds to a module for managing emotion states of the software robot. The emotion state unit 30 updates emotion state data by changing an emotion state with reference to the perception state value 96 of the blackboard, and outputs the updated emotion state data to the blackboard 90 as an emotion state value 97. At this time, an emotion state related to a type of the perception state value, i.e., an emotion state related to a particular perception state, is predetermined. Changing each emotion state by using the perception state value 96 can be performed as defined in Equation (2) below.

$$E_j(t+1) = w_{i_p} w_{j_E}(M_{TRUE} P_{i_{TRUE}} + M_{FALSE} P_{i_{FALSE}}) + \lambda(E_j(0) - E_j(t)) \quad (2)$$

In Equation (2), $E_j(t)$ and $E_j(t+1)$ represent a current emotional value and a changed emotional value, respectively. $E_j(0)$ represents a basic value to which emotions converge when there is no stimulus. At this time, $\lambda$ corresponds to a constant determining the convergence speed. $P_{i_{TRUE}}$ and $P_{i_{FALSE}}$ represent fuzzy values regarding TRUE and FALSE of a perception state value 96. $M_{TRUE}$ and $M_{FALSE}$ represent matrices for converting a perception state value 96 into a variance of an emotion state. $w_{i_p}$ and $w_{j_g}$ represent a weight corresponding to a perception state value 96 and a weight corresponding to an emotion state, respectively. According to an embodiment of the present invention, the emotion states may include happiness, sadness, anger, fear, etc., and the emotion state unit 30 determines, as a ruling emotion, an emotion state having the largest value among emotion states.

The memory unit 110 mounted in the software robot apparatus can be largely classified into a short-term storage memory, a long-term storage memory, and a working memory. The short-term memory 70 belongs to the short-term storage memory, and the episode memory 60 belongs to the long-term storage memory. The working memory and the common storage memory are not illustrated. The short-term memory 70 stores only recently-generated information during only a predetermined short period of time, and deletes a part of the information while transferring the other part of the information to the long-term storage memory. In an embodiment of the present invention, the short-term memory 70 stores information on a surrounding environment of the software robot.

A working memory is used to store necessary information during the performance of some task. The working memory detects information related to a currently performed task from the short-term storage memory and from the long-term storage memory, and then stores the detected information until the task is finished, so that the task can be the effectively performed. For instance, when a driver sees a sign indicating 'turning to the right' from a traffic sign located 50 meters in front while driving a car, the driver recognizes the contents of the traffic sign, and then makes a decision regarding when to turn the car to the right. This process corresponds to a process of recognizing a traffic sign, stored in a short-term storage memory. In addition, the information on how many seconds later the driver should turn the car to the right on the basis of a current actual speed, and the information on how to manipulate a gear, a steering wheel, and a brake pedal of the car during the process of turning the car to the right are pieces of information which the driver has already acquired through previous driving experiences, and accordingly, correspond to information stored in the long-term storage memory. However, in an actual situation, it is difficult to detect necessary information from the short-term storage memory and from the long-term storage memory, and then to immediately cope with and settle the situation. Hence, the working memory prepares information related to a currently performed task in advance, in order to instantly use information required in the process of performing a task and settle the problematic situation.

A storage memory stores program data and predetermined various set values necessary for the software robot apparatus to operate according to the present invention. The storage memory (not shown) stores a range of an unstable state and multiple pieces of artificial chromosome information set in the software robot. Also, the storage memory stores various kinds of physical states, perception states, emotion states, and types of behaviors, all of which are defined in the software robot. Additionally, the storage memory stores information related to perception states, physical states, or emotion states, in accordance with respective types of behaviors. Furthermore, the storage memory stores a variance related to each emotion state or each physical state, which are associated with the kind of certain behavior. The information described above can be included in artificial chromosome information. Also, the storage memory stores program data necessary for an operation of the software robot apparatus, information on multiple objects required to implement a cyberspace, information related to events, and event occurrence conditions. Furthermore, the storage memory stores several functions and parameters employed by the software robot apparatus.

Figures 7, 8:
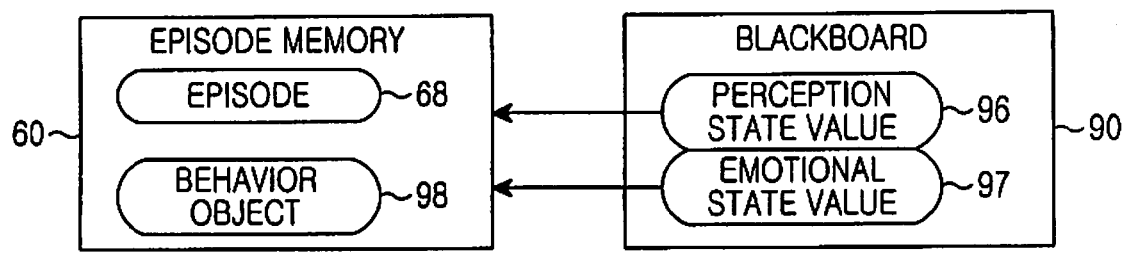
FIG. 7 illustrates a relation between an episode memory and a blackboard according to an embodiment of the present invention.
FIG. 8 illustrates a relation between a structure of an episode stored in the episode memory according to an embodiment of the present invention.

The episode memory 60 corresponds to a module which takes charge of learning related to behavior and perception of the software robot and to behavior and emotion states thereof. As illustrated in FIG. 7, the episode memory 60 determines an episode and a behavior object with reference to the perception state value 96 and the emotion state value 97. FIG. 7 illustrates the relation between the episode memory 60 and the blackboard 90 according to an embodiment of the present invention.

The episode memory 60 includes multiple episodes 68, each of which has the structure as illustrated in FIG. 8, which illustrates the structure of an episode stored in the episode memory 60 according to an embodiment of the present invention. Each episode 68 corresponds to information representing a combination between a perception state and an emotion state among the internal states defined in the software robot, and an object among the objects existing in the cyberspace and types of behaviors of the object, and may express a relation, which corresponds to each combination, between a behavior, a perception state, an emotion state, and an object. With reference to FIG. 8, the episode 68 includes a behavior 61 and an object 62, and includes, as variables, a category 63, a state 64, a variance 65, and a frequency of occurrence 66. The meaning of each piece of information is as defined in Table 10 below.

TABLE 10

| | Definition |
|---|---|
| Behavior 61 | Unique identification information of selected and expressed behavior |
| Object 62 | Unique identification information of an object associated with expressed behavior |
| Category 63 | Information representing whether a relevant episode corresponds to memorization related to a perception state or memorization related to an emotion state, and has a value of "perception" or "emotion" |
| State 64 | The state 64 stores the value of unique identification information of a perception state or the value of unique identification information of an emotion state according to the category, and has an initial value of '0' |
| Variation 65 | Amount of change of a relevant state |
| Frequency of occurrence 66 | Which represents how many times a combination of the same behavior, object, and state has been learned, and has an initial value of '0' |

The total number of episodes 68 stored in the episode memory 60 and a maximum size of the episode memory 60 corresponding to the total number of episodes 86 are determined depending on the number of perception states, and the number of emotion states, both of which are defined in the software robot, the number of objects existing in cyberspace, and the number of kinds of behaviors, and calculation of the total number can be implemented according to Equation (3) below.

Total number of episodes=(number of perception states+number of emotion states)×number of behavior types×number of objects    (3)

The episode 68 as described above is stored in the episode memory 60 according to the following process. The software robot can express a specific behavior, depending on external events, environmental information, internal states, and a user's inducement. As a result of the expression of the specific behavior, an emotion state or a perception state related to the specific behavior changes. When kinds of emotion states or perception states associated with the specific behavior are predetermined regarding a unique artificial chromosome, etc. of the software robot, a generated variance corresponding to each emotion state or each perception state is also predetermined. As a specific behavior is expressed, the episode memory 60 perceives the type of the specific behavior, an object connected with the specific behavior, and a category, a state type, and a variance according to internal states of the software robot changing in relation to the specific behavior. The episode memory 60 is searched in order to find an episode of the same combination as a combination of the perceived type of the behavior, object, category, kind of the state, and variance. When there is no episode of the same combination, the episode memory 60 adds a new episode including the perceived behavior type, object, category, state type, and variance, and then stores the added new episode. At this time, occurrence frequency of the new episode is one time, and the variance is calculated by an equation for calculating the following representative variance and is then stored. In addition, if an episode of the same combination is found, the episode memory 60 computes a representative variance by using a variance generated in response to the expressed behavior and a variance stored in response to the found episode, and stores the computed representative variance as a variance of the found episode. Also, the episode memory 60 updates the occurrence frequency, thereby updating the found episode.

For example, in a case where the software robot carries out the behavior of "eating an object 1", and the types of the states changing in relation to the object 1 correspond to hunger (−10) and happiness (+5), the episode memory 60 finds an episode including "eat-object 1-perception-hunger-(x)" and "eat-object 1-emotion-happiness-x)" in relation to the behavior of "eating an object 1." Here, x corresponds to a value representing a variance. If an episode 68 having the same combination is not found, the episode memory 60 adds an episode, including "eat-object 1-perception-hunger-(A)" and "eat-object 1-emotion-happiness-(A)". Here, A corresponds to a representative variance computed by Equation (4). Meanwhile, if an episode 68 having the same combination is found, the episode memory 60 detects a variance 65 in the found episode. Then, by using the detected variance 65 and a variance generated due to the above specific behavior, a representative variance is computed. The generated variance is predetermined. Since the episode memory 60 stores a result of learning by a behavior, the episode memory 60 does not store the variance generated due to a specific behavior as it is, but calculates a representative variance reflecting the degree of learning and stores the calculated representative variance in a related episode 68. On this account, the detected variance 65 can be regarded as the existing representative variance, and the representative variance can be calculated by Equation (4) as defined below.

Representative variance=(1−$p$)×existing representative variance+$p$×generated variance (4)

In Equation (4), '$p$' represents a degree of influence on the representative variance by the generated variance, is predetermined, and has a range of 0<$p$<1.

A process in which a set of episodes 68 is stored in the episode memory 60 will be described with reference to FIGS. 9A and 9B.

FIG. 9A illustrates six episodes stored in the episode memory 60 according to an embodiment of the present invention. The six episodes have combinations including "eat-object 1-perception-hunger-10)-1", "eat-object 2-perception-hunger-(−12)-1", "eat-object 2-emotion-sadness-(−5)-1", "eat-object 1-emotion-happiness-(10)-1", "bite-object 3-emotion-fear-(15)-1", and "bite-object 4-emotion-happiness-(−8)-1", respectively. FIG. 9B illustrates a combination of a behavior type, an object, a category, a type of state, and a variance, all of which are perceived in relation to a currently expressed specific behavior. FIG. 9B is based on an assumption that the currently expressed behavior is "eating the object 1", a state changing in connection with the behavior of "eating the object 1" is "hunger", and a variance of the changing state is −20. Further, it is assumed that the degree of influence on a representative variance by a generated variance according to the expressed behavior is 0.1. Accordingly, the episode memory 60 searches for an episode having a combination "eat-object 1-perception-hunger-x)" in relation to the currently expressed behavior, as illustrated in FIG. 9B. At this time, it will suffice if the detected episode has a combination including a behavior, an object, a category, and a state type matching with those of the combination of the episode corresponding to the currently expressed behavior. Among episodes depicted in FIG. 9A, an episode related to the currently expressed behavior is the first episode, and accordingly, the episode memory 60 detects "−10" as an existing representative variance. Then, the episode memory 60 computes a representative variance as follows by using equation (3):

representative variance=(1−0.1)×(−10)+0.1×(−20)=−11.

Hence, the episode memory 60 stores a new representative variance of '−11' in the episode associated with the currently expressed behavior as illustrated in FIG. 9C, and increases the number of times of issuance by one, thereby storing "2" as the number of times of issuance. As a result, the final episode has a combination of "eat-object 1-perception-hunger-(−11)-2".

The learning method of the episode memory 60 as described above is based on an assumption that each perception state and each emotion state do not affect each other in order to memorize various relations in a small-sized memory. Namely, if a change of each perception state and a change of each emotion state are independently memorized when a certain behavior is expressed, a large quantity of information can be memorized in a small-sized memory. Additionally, the episode memory 60 may periodically perform the memorization. This is because the episode memory 60 memorizes variances of perception states and variances of emotion states. It is thus possible to achieve effective learning only when the episode memory 60 is operated at suitable intervals.

Figure 10:
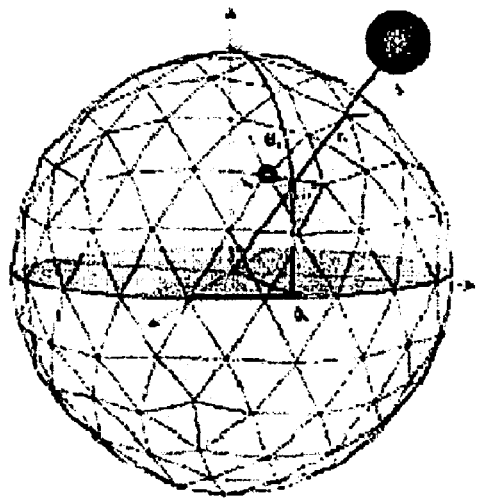
FIG. 10 illustrates a spherical coordinate system expressing a cyberspace according to an embodiment of the present invention.
Figure 11:
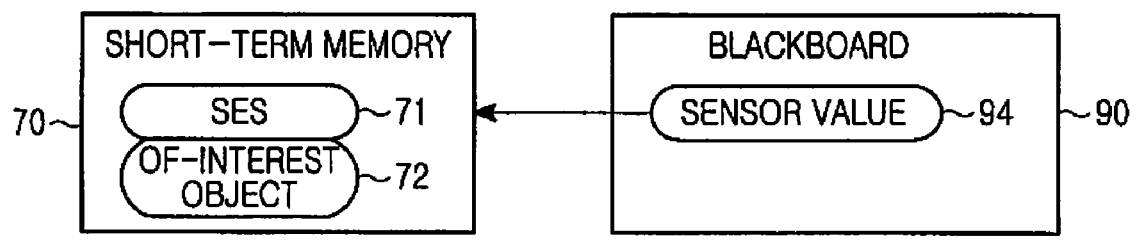
FIG. 11 illustrates a relation between a short-term memory and a blackboard according to an embodiment of the present invention.

The short-term memory 70 corresponds to a memory for storing recent information generated for a predetermined short time, in which, centering the position of the software robot, locations of other objects exist are stored as a value of Sensory Ego-Sphere (SES) 71 together with time t by using three variables, including $\gamma$, $\theta$, and $\phi$ on the spherical coordinate system as illustrated in FIG. 10. The SES 71 includes time information related to cases occurring in a certain area and object location information on the sphere, and provides the information whenever it is necessary. The short-term memory 70 stores location information of each object existing around the software robot and the uncertainty of the information. When a particular object 72, i.e. an of-interest object 72, is recognized with reference to the sensor value 94 of the blackboard 90, the short-term memory 70 stores location information of the object, and at this time, the uncertainty of the location information increases gradually as time passes. Thereafter, if the of-interest object 72 is recognized again, the location information is updated and the uncertainty becomes zero again. The software robot apparatus previously stores, as a part of artificial chromosome information, a unique object recognition distance corresponding to the type of each object related to each software robot. Accordingly, the software robot apparatus recognizes the object which is located not only within object recognition distance gene, but is also located closest to the software robot.

Figure 12:
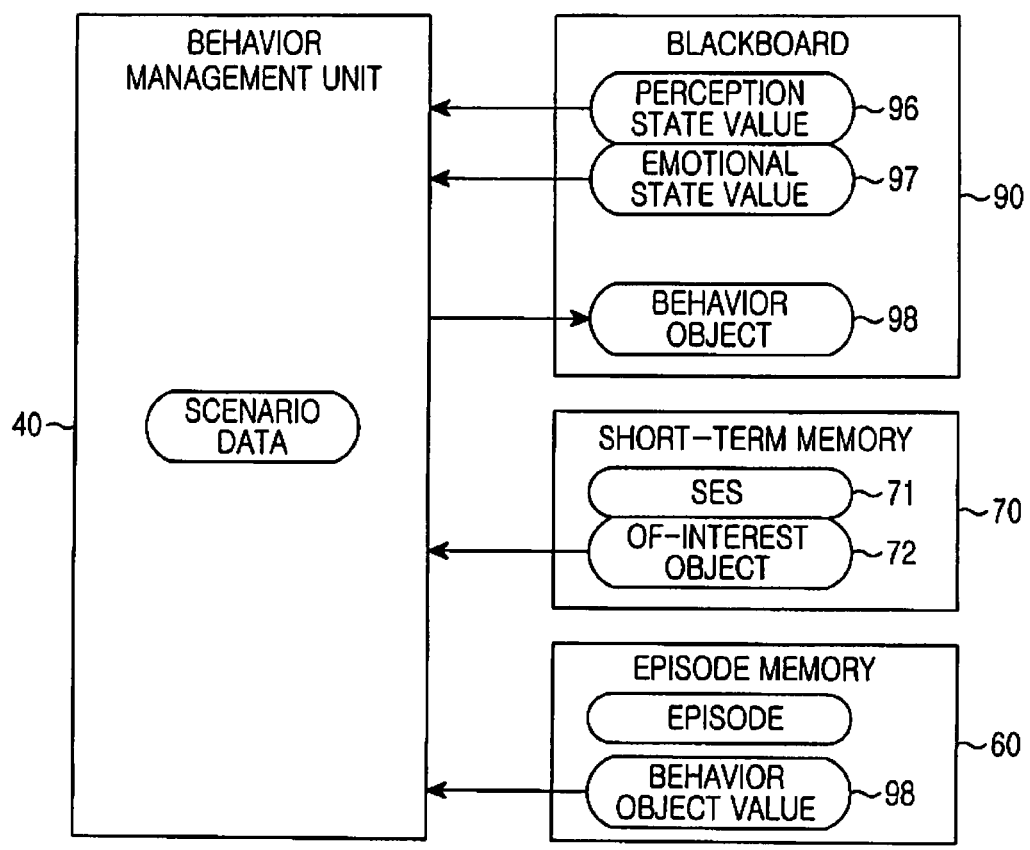
FIG. 12 illustrates a relation between a behavior management unit and a blackboard according to an embodiment of the present invention.

The behavior management unit 40 corresponds to a module that finally determines the behavior of the software robot. As illustrated in FIG. 12, the behavior management unit 40 determines a behavior by referring to the perception state value 96 and the emotion state value 97 of the blackboard 90, SES 71 and the of-interest object 72 of the short-term memory 70, and multiple episodes and the behavior object 98 of the episode memory 60. Accordingly, the behavior management unit 40 outputs a final behavior object 98 to the blackboard 90. The behavior management unit 40 determines behavior, basically referring to the episode memory 60, and if it is inevitable, controls the expression of the guide behavior induced by a user. The emotion state value 97 does not take part in behavior selection itself, and affects how to express the selected behavior itself after the selection of the behavior. That is, after selection of the behavior of "walking", emotions are used to produce the diversity of behavior, such as "happily walking", "walking with a sulky feeling", and the like. In addition, if the perception state value 96 and the emotion state value 97 are included in an unstable state range representing unstable states, the behavior management unit 40 determines behavior that must be performed due to the unstable state, by referring to the episode memory 60. In each perception state and each emotion state, an unstable state exists. A range of the unstable state is predetermined as an internal constant of the software robot, which corresponds to a genetic value.

The unstable state may exist in all kinds of cognitive states and emotion states. In other words, the unstable state signifies a state where a current perception state value 96 is out of a minimum threshold value and a maximum threshold value of a relevant perception state, or a current emotion state value 97 is out of a minimum threshold value and a maximum threshold value of a relevant emotion state. At this time, a minimum threshold value or a maximum threshold value defining the range of an unstable state in each case are given as genetic values corresponding to each software robot. In addition, the ranges of unstable states of perception and emotion may be different depending on the types of the perception and the emotion and the standards made by genetic values. In general, even though the unstable state corresponds to a case where each state value is less than a minimum threshold value or greater than a maximum threshold value, the range of an unstable state can be set between a minimum threshold value and a maximum threshold value depending on a user, a software robot, and a state type. Also, by using the current perception state value 96 and emotion state value 97, and by using the range of an unstable state corresponding to each state, a warning value representing the degree of instability of each state can be derived. A scheme of computing the warning value can be defined according to various schemes based on the range of an unstable state. For example, when the range of the unstable state is set as in a case where the state value is less than a minimum threshold value or greater than a maximum threshold value, the warning value can be set to be a value obtained by subtracting a current state value from the minimum threshold value or the maximum threshold value.

Table 11 shows an example of a scheme for deriving a warning value and ranges of unstable states of hunger and lightness when lightness (PERCEPT_LIGHT), sound (PERCEPT_SOUND), hunger (PERCEPT_HUNGER), fatigue (PERCEPT_FATIGUE), hitting (PERCEPT_HIT), and patting (PERCEPT_PAT) are given as basic perception states.

TABLE 11

```
// PERCEPT_HUNGER
    if (HUNGER perception state value > HUNGER perception
maximum threshold value){
        warning[PERCEPT_HUNGER] = HUNGER perception
    maximum threshold value – HUNGER perception state value;
    }
// PERCEPT_LIGHT
    if (LIGHT perception state value < LIGHT perception minimum
threshold value){
        warning[PERCEPT_LIGHT] = LIGHT perception
    minimum threshold value – LIGHT perception state value
    }
    if (LIGHT perception state value > LIGHT perception maximum
threshold value){
        warning[PERCEPT_LIGHT] = LIGHT perception maximum
    threshold value – LIGHT perception state value
    }
```

For example, it can be said that a case where a hunger value is greater than a predetermined reference, a case where surrounding is lighter than a predetermined reference, or a case where a sadness value is getting higher corresponds to an unstable state. In this regard, a score value indicating a stability of a life in view of a perception state and an emotion state relating to the unstable state is introduced to be effectively used for determination of a behavior. That is, when at least one state becomes an unstable state, the behavior management unit 40 searches multiple episodes memorized in the episode memory 60 and determines a behavior object 98 by selecting a combination of a behavior and an object of an episode capable of elevating the score value related to the current unstable state as highly as possible. This will be described in more detail hereinafter.

When at least one perception state or emotion state becomes an unstable state, the behavior management unit 40 searches warning values of all perception states and detects a perception state having the largest warning value. At this time, a state in which there is no perception state or emotion state of an unstable state is called a normal state. A point in time for determining the unstable state corresponds to a point in time at which each state value is updated, and the determination may be performed by the behavior management unit 40, the physical state unit 10, the perception unit 20, or the emotion state unit 30. Further, the largest warning value corresponds to a warning value indicating the most unstable state. The behavior management unit 40 transfers the perception state having the largest warning value and a corresponding warning value to the episode memory 60. Here, the perception state having the largest warning value is called a main perception state. Upon receiving the main perception state and a warning value of the main perception state, the episode memory 60 performs a first search for searching at least one episode including a perception category and the main perception state. Further, the episode memory 60 checks if an object included in each searched episode exists within the short-term memory 70. When an object included in each searched episode does not exist within the short-term memory 70, that episode is excluded from a result of the search.

According to another embodiment of the present invention, conditions of the first search may selectively include a variance direction or a magnitude of a warning value. For example, the first search may be set to be performed when a warning value of the main perception state exceeds a predetermined magnitude, or may be set to be performed only when a current warning value is greater than or less than a warning value of a most recent first search. Episodes detected through the first search as described above include a behavior 61, an object 62, a category 63, a state type 64, a variance 65, and a frequency 66 as shown in FIG. 8. Categories 63 and state types 64 of all episodes detected through the first search have the same value. In order to assist in the understanding of the description, an episode having "perception" as a value of the category 63 will be referred to as a perception episode, and an episode having "emotion" as a value of the category 63 will be referred to as a emotion episode.

The episode memory 60 performs a second search in order to detect, within an emotion episode having an emotion category 63, episodes including a behavior and an object identical to the behavior 61 and the object 62 of each perception episode detected through the first search. The second search is performed based on each perception episode detected through the first search. Further, a score value is calculated by summing variances 65 of the searched emotion episodes. Calculation of the score value is also performed based on each perception episode detected through the first search. That is, the score value is calculated by summing variances 65 of episodes, each of which has a category 63 of emotion and includes the same behavior 61 and the same object 62. When the emotion state type of the emotion episode detected through the second search is an affirmative emotion such as happiness, a variance 65 of the emotion episode is added as it is to the score value. In contrast, when the emotion state type of the emotion episode detected through the second search is a negative emotion such as sadness, anger, and fear, a variance 65 of the emotion episode is subtracted from the score value. The score value has an initial value of "0", and the types of affirmative emotions and negative emotions are predetermined. A sum of variances 63 of all emotion episodes detected through the second search based on a particular behavior 61 and a particular object 62 is determined as a final score value. After the final score value is determined, the types of the objects 62 used as a basis for the second search are compared with the types of the objects currently most focused in the blackboard 90. When the types of the objects 62 used as a basis for the second search are identical to the types of the objects currently most focused in the blackboard 90, a small compensation value is added to the final score value.

The second search and the calculation of the score value are individually performed for all the perception episodes detected through the first search. The behavior management unit 40 selects and implements a behavior 61 and an object 62 of a perception episode having the highest score value.

For example, if all the episodes within the episode memory 60 have the same variance 65 having a value of 100, there is no focused object, and three perception episodes including No. 5, No. 7, and No. 10 perception episodes were detected through a first search. Also, let us assume that a second search for each of the three perception episodes showed that three emotion episodes respectively having emotion states of happiness, happiness, and sadness were detected for the No. 5 perception episode, four emotion episodes respectively having emotion states of sadness, sadness, happiness, and happiness were detected for the No. 7 perception episode, and five emotion episodes respectively having emotion states of happiness, happiness, happiness, sadness, and happiness were detected for the No. 10 perception episode. In this case, the final score value of the No. 5 perception episode is 100 (=100+100−100), the final score value of the No. 7 perception episode is 0 (=−100−100+100+100), and the final score value of the No. 10 perception episode is 300 (=100+100+100−100+100). As a result, a combination of a behavior 61 and an object 62 finally determined in the episode 60 is the No. 10 perception episode, the behavior 61 and the object 62 of the No. 10 perception episode become the behavior object 98.

Further, by expressing the determined behavior object 98, the unstable state can be healed and related episodes are affected. The behavior selection method as described above is based on an assumption that all behaviors can be expressed only after being learned. Therefore, in the behavior selection process, an unlearned behavior can be selected from predetermined default behaviors.

Figure 13:
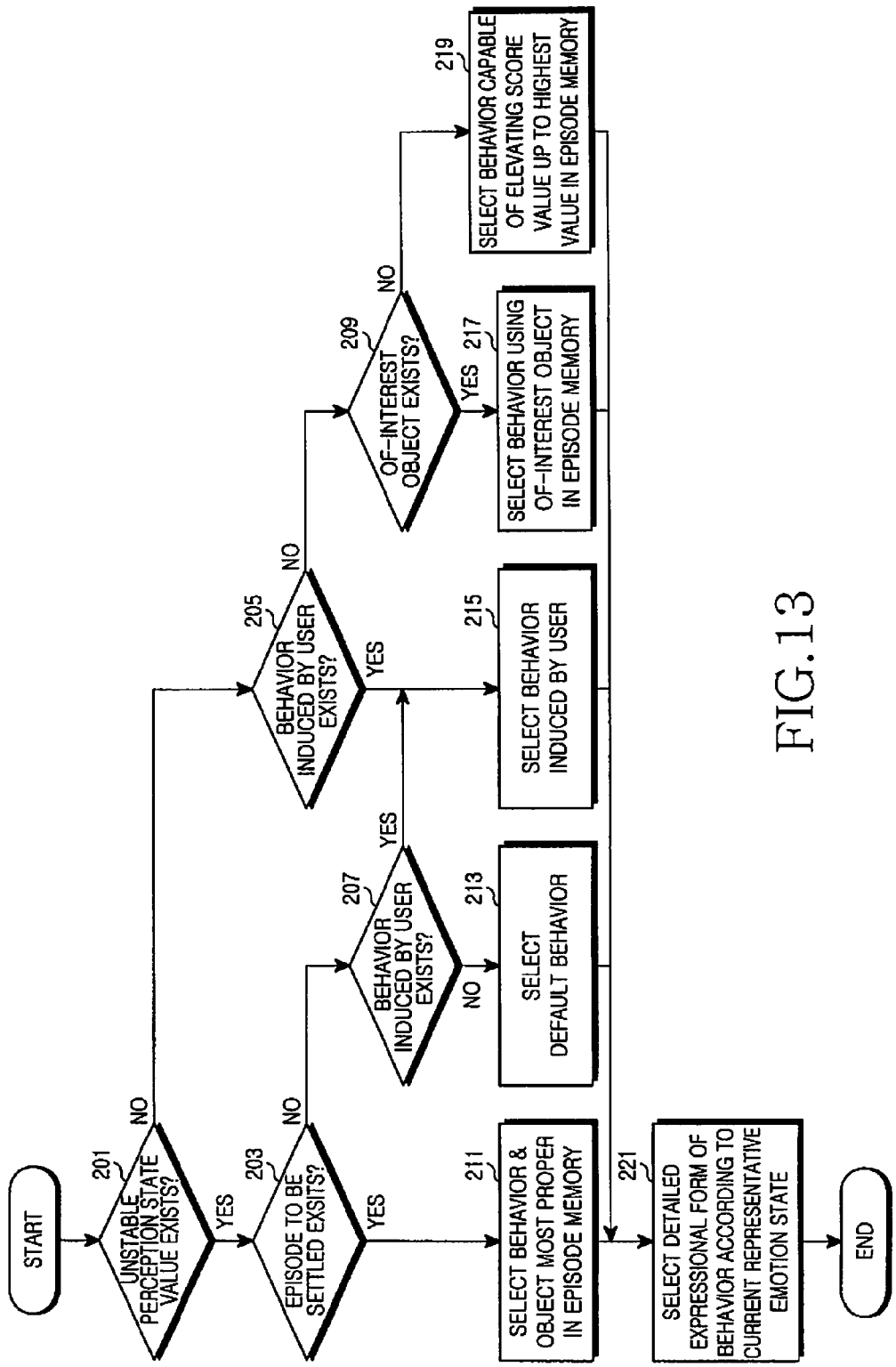
FIG. 13 is a flowchart showing an operation process of a behavior management unit according to an embodiment of the present invention.

FIG. 13 illustrates a behavior determination process of the behavior management unit 40 as described above. Referring to FIG. 13, when there is a perception state value or an emotion state value of an unstable state in step 201, the behavior management unit 40 proceeds to step 203. In step 203, the behavior management unit 40 searches for an episode that can be settled. The behavior management unit 40 proceeds to step 211 when there is an episode that can be settled and proceeds to step 207 when there is no episode that can be settled. Then, the behavior management unit 40 selects a behavior and an object that are most proper in the episode memory 60 in step 211 and then proceeds to step 221. Step 203 corresponds to a step of first search as described above, and step 211 corresponds to a step of second search and score value calculation as described above. In step 221, the behavior management unit 40 selects a detailed expressional form of the behavior according to a current representative emotion state of the software robot.

As a result of the determination in step 203, when there is no episode that can be settled, the behavior management unit 40 determines in step 207 if there is a behavior induced by a user. When there is a behavior induced by a user, the behavior management unit 40 proceeds to step 215 in which the behavior management unit 40 selects the behavior induced by the user, and then proceeds to step 221. In contrast, when there is no behavior induced by the user, the behavior management unit 40 proceeds to step 213 in which the behavior management unit 40 selects a default behavior, and then proceeds to step 221.

As a result of the determination in step 201, when a perception state value or an emotion state value of an unstable state does not exist, the behavior management unit 40 proceeds to step 205 in which the behavior management unit 40 determines if there is a behavior induced by a user. As a result of the determination in step 205, when there is a behavior induced by a user, the behavior management unit 40 proceeds to step 215 in which the behavior management unit 40 selects the behavior induced by the user, and then proceeds to step 221. In contrast, when there is no behavior induced by the user, the behavior management unit 40 proceeds to step 209 in which the behavior management unit 40 determines if there is an of-interest object. As a result of the determination in step 209, when there is an of-interest object, the behavior management unit 40 proceeds to step 217 in which it searches episodes related to the of-interest object and selects a behavior using the of-interest object in the episode memory 60. In this step, the process of searching episodes is similar to the process of episode search and behavior selection, which includes the first search, the second search, and the score value calculation, and is performed after detection of an unstable state in step 201. In more detail, when the behavior management unit 40 detects an of-interest object, that is, when there is an of-interest object within the short-term memory 70, the episode memory 60 searches episodes including the of-interest object 62. After the search, the searched episodes are classified as episodes including the same behavior 61. Then, episodes having a category 63 of emotion are searched from among the episodes classified according to each behavior 61, and a score value is calculated according to a score value calculation method as described above. That is, a final score value corresponding to each behavior 61 is calculated. Thereafter, the behavior management unit 40 selects a behavior having the highest score value. When the highest score value is below a predetermined reference value, the behavior management unit does not perform any behavior for the of-interest object.

As a result of the determination in step 209, when an of-interest object is not detected, the behavior management unit 40 proceeds to step 219 in which it selects a behavior capable of elevating the lowest score value in relation to each perception state or emotion state of a current software robot in the episode memory, and then proceeds to step 221. In step 221, the behavior management unit 40 selects a detailed expressional form of the behavior according to a current representative emotion state of the software robot. Steps 201 to 221 as described above are repeatedly performed. A process according to another embodiment of the present invention can be set to prevent execution of any more operation when there is no of-interest object as a result of the determination in step 209.

Figure 14:
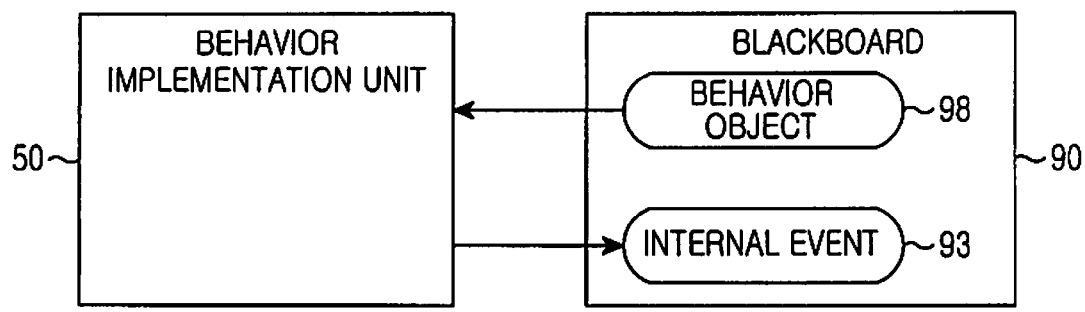
FIG. 14 illustrates a relation between a behavior implementation unit and a blackboard according to an embodiment of the present invention.

The behavior determined by the behavior management unit 40 as described above is expressed by the behavior implementation unit 50. As shown in FIG. 14, the behavior implementation unit 50 expresses a corresponding behavior by referring to the behavior object 98, determines time for continuation of the expressed behavior, generates an internal event 98 that caused the expressed behavior, and outputs the internal event 98 to the blackboard 90.

Figure 15:
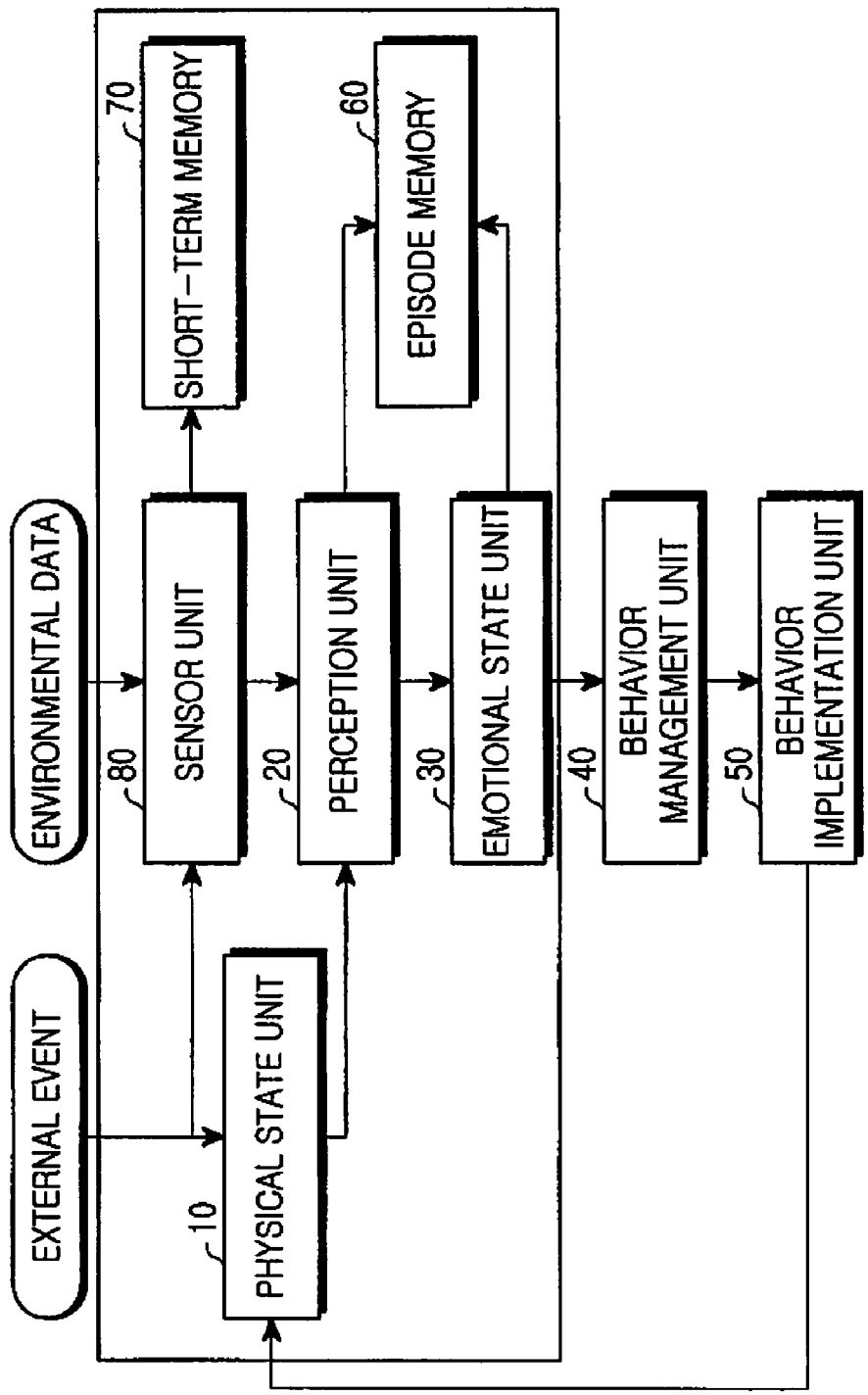
FIG. 15 is a block diagram illustrating the relation between configuration modules in a software robot apparatus according to an embodiment of the present invention.

Although each configuration module of a software robot apparatus according to the present invention as described above can be independently implemented by using a blackboard 90, an organic relation between configuration modules due to the values generated by the configuration modules can be illustrated as in FIG. 15, which is a block diagram illustrating a relation between configuration modules of a software robot according to an embodiment of the present invention.

Although the above description deals with a specific embodiment of the present invention, various additional modifications can be made without departing from the scope of the present invention. Although the episode memory 60 searches a plurality of stored episodes in order to find a proper behavior object 98 in the above-described embodiment, the behavior management unit 40 may be configured to search the episode memory 60.

In general, a genetic robot refers to an artificial creature, a software robot (i.e. sobot), or a general robot, each of which has its own genetic codes. Also, a robot genetic code signifies a single robot genome including multiple artificial chromosomes. Moreover, the software robot refers to an artificial creature in the form of software, which can move through a network, can act as an independent software agent interacting with a user, and can act as an intelligent unit of a robot that connects a hardware robot with a sensor network. Also, the term "robot" signifies the robot in the general sense, which has elements of typical senses, intelligence, and behavior in a physical environment. Accordingly, in a case where the software robot is substituted for an intelligent unit of a robot in meaning which commonly holds true, it goes without saying that the present invention is equally valid in a common robot. An intelligent unit of a robot can be replaced either through optional replacement through a network or another storage medium in a ubiquitous environment beyond time and space or by embedding a replacement in a robot during the manufacturing of the robot.

As described above, a software robot apparatus according to the present invention can act naturally, express its emotions, and interact with a user, like an actual creature, and can behave based on a physical state thereof, so that the software robot can give a more life-like feeling to a user thereof. Further, a software robot apparatus according to the present invention has a more intelligent structure, in which a result of a behavior expressed by a software robot is fed back and reflected in internal states of the software robot, so that the software robot can evolve while continuously interacting with a user. Further, a software robot apparatus according to the present invention can recognize various existing virtual creatures as independent objects and interact with multiple virtual creatures. Moreover, according to the present invention, behavior sets, each of which includes similar behaviors, are arranged and various similar behaviors are defined for each behavior set, so as to express behaviors in a more natural way and express an internal state by using a wider variety of similar behaviors. Further a software robot apparatus according to the present invention has an integrated data structure for storing input/output of all data between configuration modules.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A software robot apparatus, including a processor, the software robot apparatus providing a cyberspace in which objects, including at least one software robot, and environmental factors exist, the software robot apparatus comprising:

a sensor unit for detecting environmental information and occurrences of external events due to an interaction among the objects, and generating a sensor value;

a state unit for changing a state value of a state related to the external events and internal events occurring in relation to the software robot from among predefined physical states, predefined perception states, and predefined emotion states, which correspond to the software robot;

an episode memory unit for storing episodes representing a progress of learning according to an expression of a particular behavior, each of the episodes including an object related to the particular behavior, and one of emotion states and perception states having a state value changed when the software robot expresses the particular behavior; and a behavior unit for, when a current perception state or a current emotion state is identified as an unstable perception state based on a current perception state value or an unstable emotion state based on a current emotion state value, enabling the episode memory unit to detect an episode capable of changing the unstable perception state or emotion state into a normal state, determining a behavior and an object stored in the detected episode as a final behavior object, and expressing a behavior of the software robot with reference to the object corresponding to the final behavior object, wherein the episode memory unit detects an episode related to a behavior type of a behavior expressed by the software robot from among the episodes, calculates a representative variance based on the variance stored in the detected episode and a generated state variance corresponding to the expressed behavior, and stores the representative variance as a variance of the detected episode, and wherein the respective episodes include one of the objects, one of predefined behaviors corresponding to the software robot, one of the predefined perception states and predefined emotion states, and a variance related to the state.

2. The software robot apparatus as claimed in claim 1, wherein the environmental information includes changes in the environmental factors and positions of the objects.

3. The software robot apparatus as claimed in claim 2, wherein the state unit changes a physical state value of a physical state related to the external events and internal events occurring in relation to the software robot, changes a perception state value of a perception state related to the changed physical state and the sensor value, and changes an emotion state value of an emotion state related to the changed perception state.

4. The software robot apparatus as claimed in claim 3, wherein the behavior unit identifies a current perception state or a current emotion state as an unstable perception state when a current perception state value and a current emotion state value is included in a predefined unstable range, and generates an internal event due to an expression of the behavior.

5. The software robot apparatus as claimed in claim 4, wherein each of the external events and the internal events applies an event occurring in the cyberspace to a related software robot, and includes subjective object identification information, target object identification information, behavior type information related to the event, and effect information.

6. The software robot apparatus as claimed in claim 5, wherein the external event corresponds to an event representing an interaction among different objects, the subjective object identification information is different from the target object identification information, the internal event corresponds to an event for processing a change occurring within the software robot as a result of a behavior by the software robot without interacting with another object, and the subjective object identification information is equal to the target object identification information.

7. The software robot apparatus as claimed in claim 6, further comprising a blackboard for storing a sensor list related to the software robot, a physical state list, a perception list, an emotion state list, a behavior list, the external events occurring in the cyberspace, the internal events occurring in relation to the software robot, the environmental information, a sensor value input from the sensor unit, the emotion state value input from the state unit, the physical state value, the perception state value, and the behavior object input from the behavior unit.

8. The software robot apparatus as claimed in claim 7, wherein the state unit comprises:
 a physical state unit for perceiving physical states corresponding to respective new external events and new internal events stored in the blackboard, changing a physical state value of the perceived physical state, and outputting the changed physical state value to the blackboard;
 a perception unit for, when the physical state values or the sensor values stored in the blackboard are changed, perceiving a perception state corresponding to the changed physical state values or the changed sensor values, changing a physical state value of the perceived perception state, and outputting the changed perception state value to the blackboard; and
 an emotion state unit for, when the perception state values stored in the blackboard are changed, perceiving an emotion state corresponding to the changed perception value, changing a perceived emotion state value of the perceived emotion state, and outputting the changed emotion state value to the blackboard.

9. The software robot apparatus as claimed in claim 8, wherein the episode memory unit perceives a behavior type of a behavior expressed by the software robot, an object type of an object related to the expressed behavior in the cyberspace, and a state type of at least one state from among perception states or emotion states preset to change in relation to the expressed behavior, detects an episode that includes the perceived behavior type, the perceived object type, and the perceived state type from among the multiple episodes, computes the representative variance of the detected episode, and stores the representative variance as a variance of the detected episode.

10. The software robot apparatus as claimed in claim 9, wherein, when an episode that includes the perceived behavior type, the perceived object type, and the perceived state type does not exist, the episode memory unit generates an episode having the perceived behavior type, the perceived object type, and the perceived state type, computes the representative variance, and stores the computed representative variance in the generated episode.

11. The software robot apparatus as claimed in claim 10, which further comprises a short term memory unit for storing, as an of-interest object, type and location information of objects located within a predetermined distance from a current position of the software robot in the cyberspace by referring to a sensor value of the blackboard.

12. The software robot apparatus as claimed in claim 11, wherein the number of episodes stored in the episode memory unit is defined by number of episodes=(number of perception states+ number of emotion states)×number of behavior types×number of objects, wherein the number of perception states equals the total number of the perception states, the number of emotion states equals the total number of the emotion states, the number of behavior types equals the total number of types of the behaviors, and the number of objects equals the number of all objects existing in the cyberspace.

13. The software robot apparatus as claimed in claim 12, wherein each of the episodes further comprises category information corresponding to an included emotion state and an included perception state, and occurrence frequency information of an included behavior.

14. The software robot apparatus as claimed in claim 13, wherein the behavior unit comprises:
 a behavior management unit for determining a final behavior object and outputting the determined final behavior object to the blackboard; and
 a behavior implementation unit for expressing an actual behavior of the software robot in relation to the object corresponding to the determined behavior object, generating the internal event, and outputting the generated internal event to the blackboard.

15. The software robot apparatus as claimed in claim 14, wherein, in a condition where an episode capable of changing the unstable perception state and the unstable emotion state into a normal perception state and a normal emotion state does not exist in the episode memory unit, the behavior management unit determines a final behavior object corresponding to a behavior induced by a user when there is the behavior induced by the user, and determines a predetermined default value as a final behavior object when there is no behavior induced by the user.

16. The software robot apparatus as claimed in claim 15, wherein, in a normal state, the behavior determination unit determines a final behavior object corresponding to the behavior induced by the user if there is the behavior induced by the user, and enables the episode memory unit to detect an episode related to the of-interest object if the of-interest object exists in the short term memory unit and determines a behavior and an object stored in the detected episode as a final behavior object.

17. The software robot apparatus as claimed in claim 16, wherein, in the normal state, if an episode related to the of-interest object does not exist in the episode memory unit, the behavior management unit determines, as a final behavior object, a behavior and an object capable of raising a score value corresponding to each emotion state and each perception state of the software robot.

18. The software robot apparatus as claimed in claim 17, wherein
if perception state values or emotion state values stored in the blackboard are included in a predetermined unstable state range corresponding to each perception state or each emotion state, the behavior management unit detects a perception state currently having a greatest warning value as an important perception state, outputs the important perception state to the episode memory unit, and then determines a behavior and an object input from the episode memory unit as a final behavior object, and
the episode memory unit detects one or more candidate perception episodes including the important perception state if the important perception state is input, detects, as candidate emotion episodes, one or more episodes including an emotion state and an object included in each candidate perception episode that has a current of-interest object, computes score values corresponding to the candidate perception episodes by using a variance included in each of the candidate emotion episodes, and then outputs, to the behavior management unit, a behavior and an object included in a candidate perception episode corresponding to a highest score value among the score values.

19. The software robot apparatus as claimed in claim 18, wherein
in the normal state, the behavior management unit delivers the of object to the episode memory unit if the of-interest object exists in the short term memory unit, and determines a behavior and the of-interest object input from the episode memory unit as a final behavior object, and
the episode memory unit detects one or more candidate episodes including the of-interest object if the of-interest object is input, classifies the candidate episodes into one or more episode groups including the same behavior, extracts, as candidate emotion episodes, one or more episodes including an emotion state among episodes included in each of the episode groups, computes a score value by using a variance stored in each of the candidate emotion episodes, and outputs, to the behavior management unit, the behavior corresponding to an episode group corresponding to a highest score value from among score values corresponding to the episode groups.

20. The software robot apparatus as claimed in claim 19, wherein the warning value indicates a degree of instability of each of the emotion states or each of the perception states.

21. The software robot apparatus as claimed in claim 20, wherein the unstable state range is set by using a magnitude of the warning value.

22. The software robot apparatus as claimed in claim 21, wherein the representative variance computed by the episode memory is defined by representative variance=$(1-p)\times$existing representative variance+$p\times$generated variance, where 'p' represents a degree of influence on the representative variance by the generated variance and is predetermined within a range of $0 \leq p \leq 1$, and the existing representative variance corresponds to a variance stored in a related episode.

23. A method for expressing a behavior of a software robot by a software robot apparatus providing a cyberspace in which objects, including at least one software robot, and environmental factors exist, the method comprising the steps of:
detecting, by a sensor unit, environmental information including changes in the environmental factors and positions of the objects, and detecting occurrences of external events due to an interaction among the objects, and generating a sensor value;
changing, by a state unit, a physical state value of physical state related to the external events and internal events occurring in relation to the software robot from among predefined physical states corresponding to the software robot;
changing, by the state unit, a perception state value of perception state related to the changed physical state and the sensor value from among predefined perception states corresponding to the software robot;
changing, by the state unit, an emotion state value of emotion state related to the changed perception state from among predefined emotion states corresponding to the software robot;
detecting, by an episode memory unit, an episode related to a behavior type of a behavior expressed by the software robot from among episodes, that the respective episodes include one of the objects, one of predefined behaviors corresponding to the software robot, one of the predefined perception states and predefined emotion states, and a variance related to the state, calculating a representative variance based on the variance stored in the detected episode and a generated variance corresponding to the expressed behavior, and storing the representative variance as a variance of the detected episode; and
when a current perception state or a current emotion state is identified as an unstable perception state based on a current perception state value or an unstable emotion state based on a current emotion state value, enabling, by a behavior unit, the episode memory unit to detect an episode capable of changing the unstable perception state or emotion state into a normal state, determining a behavior and an object stored in the detected episode as a final behavior object, and expressing an actual behavior of the software robot with reference to the object corresponding to the final behavior object.

24. The method as claimed in claim 23, which further comprises a step of generating an internal event due to expression of the actual behavior.

25. The method as claimed in claim 24, wherein each of the external events and the internal events applies an event occurring in the cyberspace to a related software robot, and includes subjective object identification information, target object identification information, behavior type information, and effect information.

26. The method as claimed in claim 25, wherein the external event corresponds to an event representing an interaction among different objects, the subjective object identification information is different from the target object identification information, the internal event corresponds to an event for processing a change occurring within the software robot as a result of a behavior by the software robot without interacting with another object, and the subjective object identification information is equal to the target object identification information.

27. The method as claimed in claim 26, wherein the step of storing the representative variance as a variance of the detected episode comprises:
perceiving a behavior type of a behavior expressed by the software robot, an object type of an object related to the expressed behavior in the cyberspace, and a state type of at least one state from among perception states or emotion states preset to change in relation to the expressed behavior;
detecting an episode that includes the perceived behavior type, the perceived object type, and the perceived state type from among the episodes, computing the representative variance of the detected episode, and storing the representative variance as a variance of the detected episode; and
when an episode that includes the perceived behavior type, the perceived object type, and the perceived state type does not exist, generating an episode having a combination of the perceived behavior type, the perceived object type, and the perceived state type, computing the representative variance, and storing the computed representative variance in the generated episode.

28. The method as claimed in claim 27, which further comprises storing, as an of-interest object, type and location information of objects located within a predetermined distance from a current position of the software robot in the cyberspace by referring to the sensor value, in a short term memory unit.

29. The method as claimed in claim 28, wherein the number of episodes stored in the episode memory unit is defined by number of episodes=(number of perception states+
number of emotion states)×number of behavior
types×number of objects, where the number of perception states equals the total number of the perception states, the number of emotion states equals the total number of the emotion states, the number of behavior types equals the total number of types of the behaviors, and the number of objects equals the number of all objects existing in the cyberspace.

30. The method as claimed in claim 29, wherein each of the episodes further comprises category information corresponding to an included emotion state and an included perception state, and occurrence frequency information of an included behavior.

31. The method as claimed in claim 30, further comprising, in a condition where an episode capable of changing the unstable perception state and the unstable emotion state into a normal perception state and does a normal emotion state does not exist in the episode memory unit:
Determining, by the behavior unit, a final behavior object corresponding to a behavior induced by a user when there is the behavior induced by the user, thereby expressing an actual behavior of the software robot to an object corresponding to the final behavior object; and
determining, by the behavior unit, a predetermined default value as a final behavior object when there is no behavior induced by the user, thereby expressing an actual behavior of the software robot to an object corresponding to the final behavior object.

32. The method as claimed in claim 31, further comprising, in a normal state, determining, by the behavior unit, a final behavior object corresponding to a behavior induced by the user if there is the behavior induced by the user, and expressing an actual behavior of the software robot to an object corresponding to the final behavior object.

33. The method as claimed in claim 32, further comprising detecting, by the episode memory unit, an episode related to the of-interest object if the of object is detected, determining, by the behavior unit, a behavior and an object stored in the detected episode as a final behavior object, and then expressing an actual behavior of the software robot to an object corresponding to the final behavior object, in the normal state.

34. The method as claimed in claim 33, which further comprises a step of determining, by the behavior unit, as a final behavior object, a behavior and an object capable of raising a score value corresponding to each emotion state and each perception state of the software robot if an episode related to the of-interest object does not exist in the episode memory unit, and then expressing an actual behavior of the software robot to an object corresponding to the final behavior object, in the normal state.

35. The method as claimed in claim 34, wherein, when a current perception state or a current emotion state corresponds to a predetermined unstable perception state or a predetermined unstable emotion state with reference to the perception state value and the emotion state value, the step of expressing, by the behavior unit, an actual behavior of the software robot comprises:
if perception state values or emotion state values stored in the blackboard are included in a predetermined unstable state range corresponding to each perception state or each emotion state, detecting a perception state currently having a greatest warning value as an important perception state;
detecting one or more candidate perception episodes including the important perception state;
detecting, as candidate emotion episodes, one or more episodes including an emotion state and an object included in each candidate perception episode that has a current of object;
computing score values corresponding to the candidate perception episodes by using a variance included in each of the candidate emotion episodes, and then determining, as a final behavior object, a behavior and an object included in a candidate perception episode corresponding to a highest score value among the score values; and
expressing an actual behavior of the software robot to an object corresponding to the final behavior object.

36. The method as claimed in claim 35, wherein, when the of-interest object is detected in the normal state, the step of expressing, by the behavior unit, an actual behavior of the software robot comprises:
detecting one or more candidate episodes including the of-interest object if the of-interest object is detected in the normal state;
classifying the candidate episodes into one or more episode groups including the same behavior, extracting, as candidate emotion episodes, one or more episodes including an emotion state among episodes included in each of the episode groups, computing a score value by using a variance stored in each of the candidate emotion episodes;

determining, as a final behavior object, the of-interest object and a behavior corresponding to an episode group corresponding to a highest score value from among score values corresponding to the episode groups; and expressing an actual behavior of the software robot to an object corresponding to the final behavior object.

37. The method as claimed in claim 36, wherein the warning value indicates a degree of instability of each of the emotion states or each of the perception states.

38. The method as claimed in claim 37, wherein the unstable state range is set by using a magnitude of the warning value.

39. The method as claimed in claim 38, wherein the representative variance computed by the episode memory is defined by $$\text{representative variance} = (1-p) \times \text{existing representative variance} + p \times \text{generated variance},$$

where 'p' represents a degree of influence on the representative variance by the generated variance and is predetermined within a range of $0 \leq p \leq 1$, and the existing representative variance corresponds to a variance stored in a related episode.

* * * * *